United States Patent
Cochran

[15] 3,645,682
[45] Feb. 29, 1972

[54] PROCESS FOR PRODUCING PHOSPHORIC ACID BY THE USE OF ION EXCHANGE RESINS

[72] Inventor: Linden Wayne Cochran, Basking Ridge, N.J.

[73] Assignee: Multi-Minerals Limited, Toronto, Ontario, Canada

[22] Filed: Sept. 13, 1967

[21] Appl. No.: 667,568

[52] U.S. Cl. .................................. 23/165, 23/337, 23/145, 23/154, 23/20, 23/22
[51] Int. Cl. ....................................... C01b 25/18
[58] Field of Search ............... 260/2.1, 2.2; 23/165 C, 165, 23/50 BE

[56] References Cited

UNITED STATES PATENTS

| | | | |
|---|---|---|---|
| 2,477,558 | 8/1949 | Almy et al. | 260/2.2 |
| 3,022,259 | 2/1962 | Pearce | 260/2.1 |
| 3,374,055 | 3/1968 | Villalon | 23/107 |
| 3,382,035 | 5/1968 | Slater | 23/66 |
| 2,334,904 | 1/1943 | Cheetham | 260/45 |

FOREIGN PATENTS OR APPLICATIONS

| | | | |
|---|---|---|---|
| 449,227 | 6/1948 | Canada | 23/50 BE |
| 498,812 | 12/1953 | Canada | 23/165 |
| 1,474,086 | 2/1967 | France | 23/165 |

OTHER PUBLICATIONS

Thilo et al., Chem Abstracts, Vol. 1961 7774f

Primary Examiner—Oscar R. Vertiz
Assistant Examiner—Gregory A. Heller
Attorney—Norman N. Holland

[57] ABSTRACT

The invention relates to an improved method of ion exchange. The inventive concept involves directly contacting a substantially dry ion exchange resin with a substantially dry material which material is solubilized by the resin. The inventive principle is applicable to cationic or anionic resins and is adaptable to fixed bed, semimoving bed or continuous ion exchange systems. New results and advantages include significantly improved quality and yield of ion exchange product. The invention is particularly applicable to the production of phosphoric acid produced by reacting monocalcium orthophosphate with a strong acid ion exchange resin on the hydrogen cycle.

11 Claims, 1 Drawing Figure

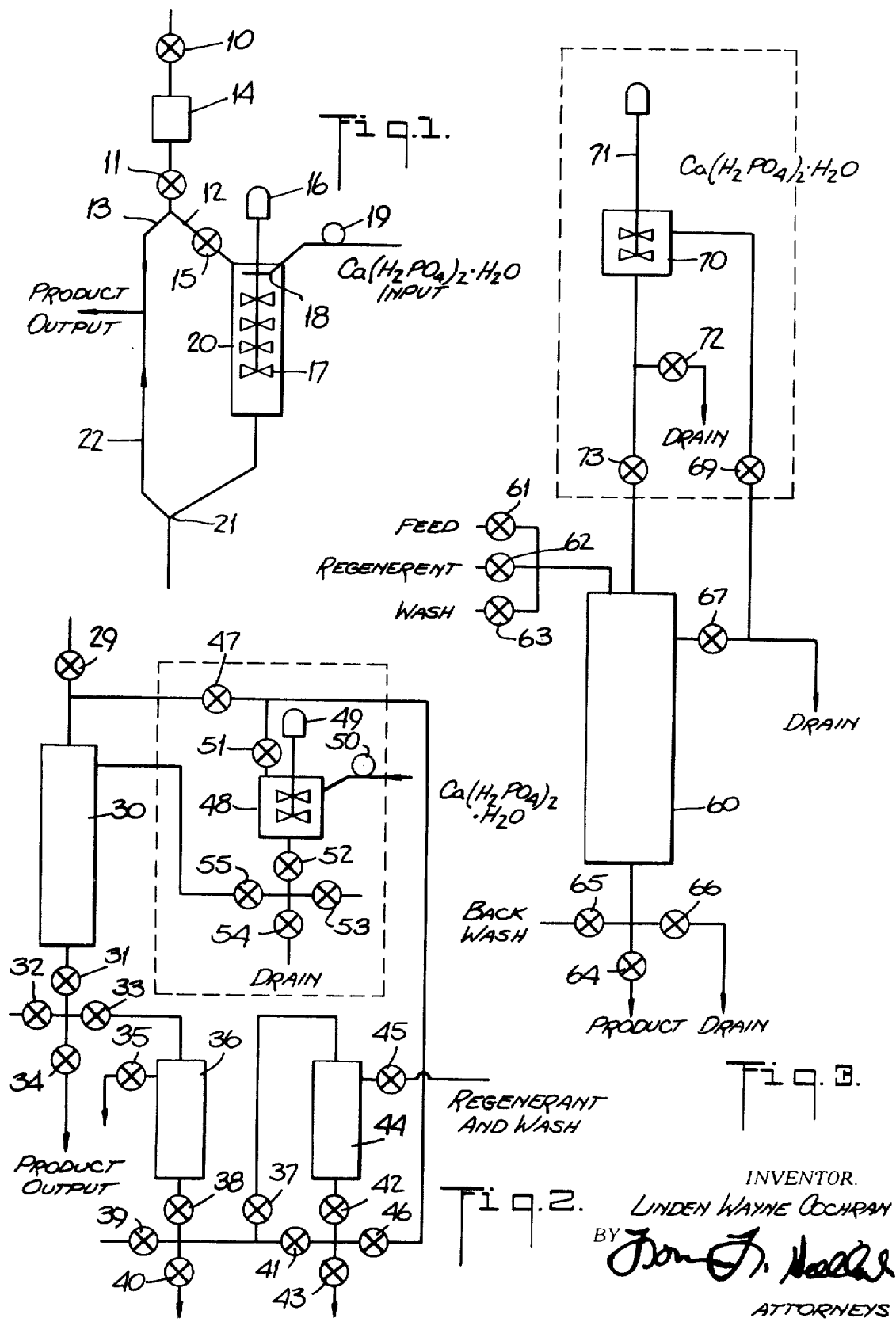

PROCESS FOR PRODUCING PHOSPHORIC ACID BY THE USE OF ION EXCHANGE RESINS

BACKGROUND OF THE INVENTION

The use of ion exchange resins is well known and is exemplified in the production of phosphoric acid from monocalcium orthophosphate. Monocalcium orthophosphate may be obtained as a principal reaction product of a calcium salt with phosphoric acid. The calcium salt may be limestone or preferably, the tri-calcium salt of phosphoric acid. In the more typical case of the employment of apatite to react with phosphoric acid, the reaction may be depicted by the following equation:

$$[Ca_3(PO_4)_2]_3 \cdot CaF_2 + 14H_3PO_4 + 10H_2O \rightarrow$$
$$10Ca(H_2PO_4)_2 \cdot H_2O + 2HF \uparrow$$

If the salt thus produced is further reacted by contacting it with a strong acid ion exchange resin on the hydrogen cycle, the calcium ions (and such other contaminating cations as may be present in the entrained acid adhering to the salt) will be exchanged for the hydrogen ions on the resin active sites and the released hydrogen ions will then combine with the $H_2PO_4$ anions to form phosphoric acid.

Concommitantly with the exchange action, or preceding it, there may be another reaction occurring in which the acid characteristics of the resin predominate. The present process can be used with a number of strong acid cationic exchange resins. Many types of such resins are known, such as the nuclear sulfonic type, which is generally designated "Dowex 50". In this instance the nuclear sulfonic acid, which constitutes the source of hydrogen ion, and which is an integral part of the resin actually dissolves the contacted salt in the same fashion that a liquid acid does. So long as there is sufficient polar solvent present to permit the migration of the ionized hydrogen ions of the resin, such acid reaction can occur. The general process can be represented by the following equations:

$$2RH + Ca(H_2PO_4)_2 \cdot H_2O \rightarrow RCa + 2H_3PO_4 + H_2O$$
$$xRH + M_y(PO_4)_z \text{ etc.}, \rightarrow R_xM_y + z H_3PO_4 \text{ etc.,}$$

wherein RH represents a strong acid ion exchange resin and $M_y$ represents any metallic cation that will combine to form a phosphate salt or that may be present in the entrained phosphoric acid and which is solubilized by nuclear sulfonic acid.

While the foregoing techniques and reactions are well known the physical process of bringing the resin and the salt into contact to promote the desired reactions and the subsequent recovery of the produced acid from the resin pose significant problems in the art, particularly in the case of a relatively viscous acid such as phosphoric.

Monocalcium orthophosphate is only limitedly soluble in water or in phosphoric acid. In either case, the procedure of first dissolving the salt in a liquid prior to contacting the dissolved material with the ion exchange resin necessitates transporting a large volume of liquid through the resin bed for a relatively limited volume of new product. Moreover, if water is used as solute, the resulting product is so dilute, i.e., the concentration of $P_2O_5$ is so low, as to require extended evaporation before the product is of an economic concentration. Use of acid as solvent may mitigate this latter objection but not the former. That is, the problem of large volumes of liquid for relatively limited amount of new product continues to exist. The dilution is masked by the fact that the acid eluted from the resin bed is at least as concentrated as the solvent acid, whereas ideally the concentration of the product should be equal to the sum of the concentration of the solvent acid plus the added $P_2O_5$ from the monocalcium orthophosphate less water of hydration.

A further disadvantage to the use of solubilization techniques is that very substantial losses of materials can occur. For example, if the loss of $P_2O_5$ in the ion resin bed is 0.1 percent and the solvent is $H_3PO_4$ of a strength to provide the most effective solubilization of the monocalcium orthophosphate, the equivalent loss of $P_2O_5$ from the raw material from which the monocalcium orthophosphate is produced is 1.0 percent.

In an effort to overcome the foregoing and other disadvantages of the prior art, an investigation was undertaken with a view toward utilizing the aforementioned resins primarily in their acid function and secondarily in their capacity as ion scavengers. There was thus required a new approach to the procedure of contacting the resin and salt and handling the resulting product. As a first approximation, the resin was removed from the column, vacuumed free of as much adhering water as possible and contacted with 'dry' monocalcium orthophosphate salt. The term 'dry' salt as used here, refers to monocalcium orthophosphate which has been vacuumed free of as much residual free acid as possible, and which contains up to about 14 percent free $H_3PO_4$, generally, from about 10 percent up to about 14 percent. It should be noted that this salt is very difficult to render entirely free of acid of manufacture except by unusual procedures that would not ordinarily be employed where the end use of the salt is the further conversion to orthophosphoric acid. The acid capability or function of the resin operated to dissolve the salt promptly. The subsequent recovery of the produced acid however, presented problems. Filtration was attempted, but with only mediocre success. Recoveries of 40–50 percent of the theoretical production were the best that could be achieved but concentration of product was higher than had been previously attained. Return of the resin-acid mixture to a normal column arrangement resulted in a return of the yields to normal, i.e., virtually stoichiometric. The concentration was found to be lower than that achieved by vacuuming the resin-acid mixture on a regular filter, but the leakage of calcium ion was severe.

OBJECTS OF THE INVENTION

Accordingly, a principal object of the present invention is to provide an improved method of ion exchange unattended by the aforementioned disadvantages of the prior art.

Another object of the invention is to provide an improved method of ion exchange which is characterized by simplicity, flexibility and adaptability to fixed bed, semimoving bed or continuous ion exchange systems.

Still another object of the invention is to provide an improved method of ion exchange for the production of acid values of increased concentration and reduced tramp ion content.

Yet another object of the invention is to provide an improved method for the production of phosphoric acid of increased $P_2O_5$ content.

Other objects will in part be obvious and in part appear hereinafter in the following detailed description and the drawings.

SUMMARY OF THE INVENTION

This invention relates to an improved method of ion exchange and particularly, to an improved method of contacting ion exchange resins and soluble materials. More particularly, the invention relates to an improved method for producing phosphoric acid by contacting a strong acid ion exchange resin on the hydrogen cycle with monocalcium orthophosphate.

An improved method of treating a material with an ion exchange resin is obtained according to the present invention by treating the material with the resin in two stages. In the first stage both the resin and material are contacted while partially dehydrated. The quantity of resin employed in the first stage is that quantity at least sufficient to solubilize the material. In the second stage, the resultant mass is contacted with the remainder of the resin.

DETAILED DESCRIPTION

In order to avoid the disadvantages described above, a portion only of the resin is used in solubilizing the acid. This may be accomplished in a separate vessel, and then the resin-acid mixture may be contacted with the balance of the resin in a normal resin column. The resulting product is cation-free, the concentration is high enough for many inplant purposes, and the use of solubilizing fluids with the associated problems aforementioned is avoided.

It has been found that as little as about 30 percent of the resin required by the calcium equivalents to be removed could be utilized to solubilize the monocalcium orthophosphate—the remaining resin then serving as a cation absorber in a normal column. Heating the reacting mixture of resin and salt assists somewhat in the solubilization. Agitation is desirable to insure intimate contact between as much of the resin and salt as possible and in as short a time interval as possible.

It has also been found that with moderate agitation the reaction proceeds to equilibrium in 2 to 3 minutes, the time being somewhat less if a smaller proportion of resin is used for the reacting step. The elution of the acid, after the acid-resin mixture had been returned to the column containing the balance of the resin, follows normal procedures.

The moisture content of the resin and of the material being treated is preferably low. There is no advantage in having an amount of moisture which results in a grossly diluted product. The essential criterion is that there be enough moisture in the solid material and the resin combined to promote the migration of ions. In the case of dry monocalcium orthophosphate, there is enough moisture entrained on the resin even after vacuum filtering to initiate the formation of phosphoric acid from the monocalcium orthophosphate. This reaction releases sufficient additional liquid to promote the dissolution of the monocalcium orthophosphate and electrolytic transfer of ions from the monocalcium orthophosphate to the resin and vice versa.

Where a continuous ion-exchange system is used to the moisture criteria will be determined by the mechanical equipment itself. The material to be dissolved must be brought into physical contact with the resin in a closed chamber. The substance to be dissolved must be forced into the chamber and this can best be done if there is enough moisture associated with the substance so that its physical consistency will lend itself to transmission by a pumping device.

The inventive concept is adaptable without undue mechanical complications to fixed bed, moving bed, or continuous ion exchange systems as may be readily seen from the drawings wherein:

FIG. 1 depicts a flow diagram of continuous ion exchange system embodying the invention;

FIG. 2 depicts a flow diagram of a moving bed ion exchange system embodying the invention; and FIG. 3 depicts a flow diagram of a fixed bed ion exchange system embodying the invention.

Adaptation of the inventive concept to a continuous system is depicted in FIG. 1. The resin in the loading zone is divided into two portions: one of which serves as a solubilizing/partial ion removal section, the second as a polishing unit.

The operation of the continuous system may be manual or automatic and proceeds as follows: a cycle is initiated wherein valve 10 closes and valves 11 and 15 open. A charge of fresh resin from the pulse chamber 14 is injected into the resin loading zone, comprising a dissolving leg 12 and a polishing leg 13. The pipe diameters of the legs 12 and 13 are so constructed that the proportion of resin going down the dissolving leg 12 and the polishing leg 13 is adjusted to achieve maximum utility in each function. At the conclusion of the pulse cycle, valves 11 and 15 close. Monocalcium orthophosphate enters the mixing chamber 20 through distributor 18 and is solubilized. The produced acid forces the fluid flown down the chamber 20 and adjoining leg to junction 21 where the fluid then flows up the polishing leg 22, countercurrently to the flow of fresh resin. The resin removes the ions from the mixture to form the acid.

Any dilution of the acid produced by virtue of the pulsing medium, which is normally water, can be minimized by reducing the flow of resin down the solving leg to the minimum required to achieve conversion of the salt to the corresponding acid form. However, if the pulsing medium is the same acid as that to be released by the acid dissolving action of the resin there will be no dilution of product. In the case of the continuous system, the use of phosphoric acid of a concentration between 45 percent and 50 percent by weight achieves maximum solubility of the monocalcium orthophosphate and simultaneously minimizes dilution of the product acid.

To facilitate transfer of the monocalcium orthophosphate from the storage area to the continuous ion exchange system the material can be converted into a pastelike mass by slight wetting with phosphoric acid. The material can then be readily pumped and extruded into the reaction chamber.

FIG. 2 illustrates the practice of the present invention in a so-called moving bed or semicontinuous installation. Valve 29 permits ion exchange resin to be introduced to column 30.

A premixing vessel 48 shown having an agitator 49, feed pump 50 and associated valves and piping is provided. A portion of the ion exchange resin is directed to the premixing vessel 48. The amount directed to vessel 48 is controlled by valve 47 with valve 51 open and valve 52 closed. The wet resin is drained of contained fluid through valves 52 and 54 at the bottom of tank 48.

Thereafter, valves 52 and 54 are closed and a charge of monocalcium orthophosphate is injected into tank 48 through pump 50 or, if desired, the dry salt can be weighed in from a weigh hopper. The mass is then stirred by the motor-agitator assembly 49 so that the salt is solubilized. Upon completion of the reaction, the resin-acid mass is transferred to vessel 30 for completion of the ion removal by the resin awaiting there. A suitable transporting medium would be phosphoric acid. This would be introduced as a stream through valve 53 with valve 54 closed.

Following exhaustion of the resin, valves 31 and 33 are opened and valve 34 is closed. A jet of water or other liquid medium entering through valve 32 is employed to transfer the resin to the backwash tank 36, where entrained solids are removed by a stream of water through valve 39 with valve 38 open and valves 37, 40 and 41 closed. The stream passes up through the resin and out of backwash tank 36 through valve 35.

After the backwash step is completed, valves 37 and 38 are opened and valves 40, 41 and 42 are closed. A stream of water or other suitable medium is permitted to enter the line by opening valve 39 and the resin is transferred to vessel 44 for regeneration. Regenerant is introduced by opening valve 45 after first closing valve 41. Eluate is recovered by opening valves 42 and 43. The resin may be washed to remove entrained regenerant by following the regenerating procedure using wash solution in place of regenerant.

Following regeneration and washing, the resin in transferred back to vessel 30, again using a jet of suitable liquid medium through valve 39 but with valves 41, 42, 46 and 47 open and valves 38, 40, 43 and 37 closed. The resin is now ready for another loading cycle.

Following the regeneration step in vessel 44 the regenerated resin is transferred as aforedescribed to vessel 30 except for an aliquot to be utilized for the solubilization step.

FIG. 3 illustrates the application of the inventive principle to a fixed-bed ion exchange system. The resin in vessel 60 is loaded to operating capacity with feedstock entering through valve 61 and product leaving through valve 64. When the resin is fully loaded, the feed solution is halted by closing valve 61 and entrained material is then washed from the resin by opening wash valve 63. Following completion of the wash step, valve 63 is closed and valves 62 and 66 are opened to permit regenerant to flow through the resin bed. Following regeneration the resin is again washed to remove entrained regenerant.

Following regeneration and washing valves 65 and 67 are opened and valves 61, 62, 63, 64, 66, 69 and 73 are closed to allow the resin bed to be backwashed to remove entrained solids and loosen the bed. The bed, after draining excess backwash material through valve 66, is ready for another loading cycle.

A mixing vessel 70, with associated mixing and feeding equipment and the necessary valves and plumbing to connect the new vessel with the preexisting loading vessel, is provided. Following completion of the backwashing, valve 67 is closed and 69 is opened, thereby permitting the flow of resin up into vessel 70. A screen may be provided over the outlet from vessel 60 to prevent loss of resin in the backwash step. After vessel 70 has received the necessary quantity of resin, valve 72 is opened to permit drainage of excess moisture therefrom. An appropriate quantity of monocalcium orthophosphate is then added to the damp resin in vessel 70 and the mass is stirred by the motor-agitator arrangement 71. When equilibrium has been achieved, valve 73 is opened and the acid-resin mass is allowed to drop into the waiting column 60 where the solution is further polished. If it is necessary, a small amount of water or acid can be used to wash the resin-acid mass, which tends to be somewhat viscous, from vessel 70.

It is to be understood that the foregoing illustrations are not intended to be limiting but merely demonstrate methods whereby the inventive principle may be employed. The invention has been illustrated with reference to phosphoric acid, but is not limited to the preparation of phosphoric acid.

The process of the present invention is applicable to various ion exchange methods such as, for example, the removal of iron, calcium or magnesium from water or phosphoric acid solutions, the removal of aluminum from chromic acid, or from phosphoric acid mixtures, the removal of iron from hydrochloric acid, the removal of uranium from uranium sulfate solutions, and the removal of rare earth cations from polar solvents.

Workers skilled in the art will be led to alternative means whereby the resin and the salt disclosed herein may be contacted without departing from the spirit and scope of the invention and whenever a chemical substance is soluble in the solution that results from the reaction of such substance with the ion exchange resin, whether cation or anion, the inventive principle is applicable.

What is claimed is:

1. In a method for producing phosphoric acid from a monocalcium orthophosphate salt by contacting the salt with a cationic exchange resin on the hydrogen cycle, the improvement comprising providing a quantity of resin, dividing said quantity into two portions, said quantity of said two portions being at least sufficient to remove the calcium values from the salt, the first portion being a quantity of resin sufficiently large to solubilize the salt from its substantially dry, undissolved state, in which state said salt contains up to about 14 percent free phosphoric acid, contacting the substantially dry, undissolved salt with the first portion of resin, said first portion of resin being substantially dry and containing only enough polar solvent to permit migration of ions, thereafter adding the resultant mass of said resin and solubilized salt that is thereby formed to the second portion of resin to form phosphoric acid and separating said phosphoric acid.

2. A process as claimed in claim 1 in which the resin is of the nuclear sulfonic acid type.

3. A process as claimed in claim 1 wherein said salt contains between 10 and 14 percent free phosphoric acid.

4. A process according to claim 1 wherein said sequence of steps are repeatedly performed to provide a continuous process.

5. A process according to claim 1 wherein said resin, before dividing, is introduced to a loading zone by pulsation with a phosphoric acid medium having a composition substantially the same as the desired ion exchange product.

6. A process according to claim 1 wherein the resin remaining after the separating step is washed to remove substantially entrained solids, the washed resin is regenerated and recylced to the dividing step.

7. A process according to claim 1 wherein the first contacting step is conducted in a first vessel and the second contacting step is conducted in a second vessel.

8. A process according to claim 7 wherein mass transfer from said first vessel to said second vessel is carried out by permitting the mass in said first vessel to drop into said second vessel.

9. A process as claimed in claim 1 wherein agitation is employed to aid solubilization.

10. A method according to claim 1 wherein the first portion of the resin comprises at least about 30 percent of the total quantity of resin employed in both steps.

11. A method according to claim 1 wherein heating is employed to aid solubilization.

* * * * *